March 23, 1971  D. B. QUAYLE ET AL  3,572,292
ARTIFICIAL OYSTER CULTCHES
Filed June 27, 1969
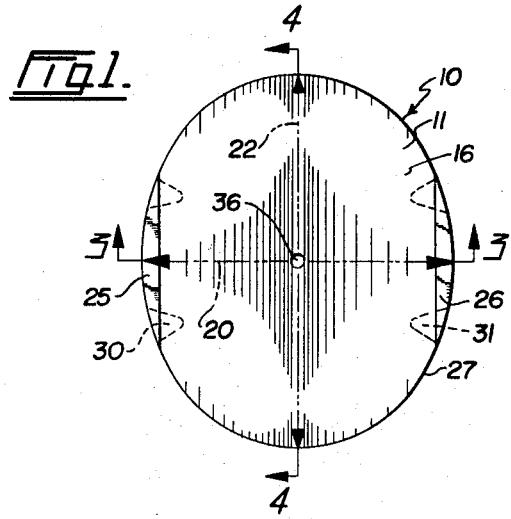
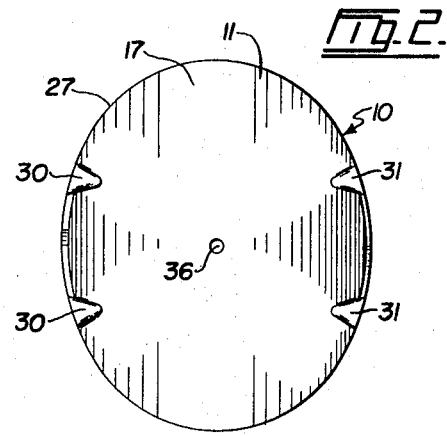
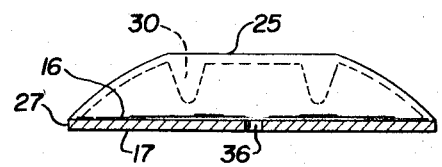
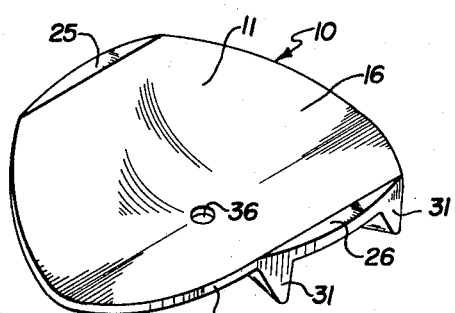
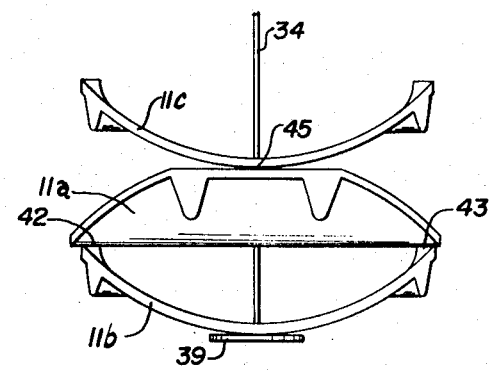
INVENTORS
DANIEL B. QUAYLE
TREVOR P. CLARK
BY
Fetherstonhaugh & Co.
ATTORNEYS

United States Patent Office

3,572,292
Patented Mar. 23, 1971

3,572,292
ARTIFICIAL OYSTER CULTCHES
Daniel B. Quayle, Nanaimo, British Columbia, and Trevor P. Clark, North Vancouver, British Columbia, Canada, assignors to Canadian Patents and Development Limited, Ottawa, Ontario, Canada
Filed June 27, 1969, Ser. No. 837,088
Int. Cl. A01k 61/00
U.S. Cl. 119—4                                    9 Claims

ABSTRACT OF THE DISCLOSURE

An artificial oyster cultch made up of a thin body of any desired shape, having opposite face sides with bearing surface means on one side, and spacer means projecting from the opposite side thereof and adapted to bear against the bearing surface means of the body of another cultch when the cultches are operatively placed together. The bearing surface means and the spacer means are positioned to keep most of the cultch bodies separated from each other when they are in operative positions, usually in a vertical column including a plurality of cultches held together on a wire or string.

BACKGROUND OF THE INVENTION

Since the time of the ancient Egyptians, the oyster industry has depended on the collection of oyster larvae, referred to as "spat," on various materials to which they attach themselves, and they are subsequently distributed on suitable oyster beds where the oysters are allowed to develop and are finally harvested when they have reached a suitable size. The materials used as collectors of spat have consisted of stones, oyster shells, bamboo, tiles, tarred ropes and rubber tires, with the use of oyster shells and bamboo predominating. Although many other materials such as glass, portland cement, paper, wood, ceramics and many plastics have been tried, there have been no economically feasible or successful substitutes for the ancient use of oyster shells or bamboo. There are a number of reasons for the failure of these substitutes, such as excessive weight or cost, difficulties of handling or reluctance of the oyster larvae to accept the materials. Even the oyster shells, bamboo and tiles, although attractive to oyster spat, suffer from enormous disadvantages for use in the oyster industry. These materials are difficult and costly to handle. Unless such collectors are placed out very close to the time of spawning of the oysters, slime forms on their surfaces and they are subsequently rejected by the young oyster larvae. In the Western hemisphere where the use of bamboo is not practical for costly labour reasons, the use of oyster shell, which is the most predominating practical cultch in use, has many disadvantages. Due to the shape of oyster shell, a large percentage of the spat are killed owing to the collection of silt on the shell, or they die when trapped underneath.

Other materials have been tried for cultches, such as portland cement aggregates, plastic, and the like, but these also suffer from the disadvantages associated with use of shell. Recent attempts have been made to overcome the natural reluctance of the spat to accept plastics by making cultches of these materials with very rough surfaces, with or without coating of lime. However, they have not been very successful. The oysters do not adhere well to plastic and frequently fall off when too young and die in mud or slit. Also, since the plastic will not disintegrate in sea water, there still remains the problem of separation of the oysters after approximately one year.

SUMMARY OF THE INVENTION

The present invention overcomes the above difficulties by providing a cultch that is lightweight, easy to handle, does not collect slime or silt, almost its entire area is available for the deposition of spat, and is shaped so that the spat always have access to food and water. These cultches can be quickly and easily stung on wires or string, are self spacing, and can never get too close together even if one is turned out of its natural position.

An artificial oyster cultch according to the present invention comprises a thin body having opposite face sides, bearing means on one side of the body, and spacer means projecting from the opposite side thereof and adapted to bear against the bearing surface means of the body of another cultch when the cultches are operatively spaced together, said bearing surface means and said spacer means being positioned to keep most of the cultch bodies separated from each other. The bodies aer quite thin, something of the order of ⅛ inch, and they may be of any desired shape, but they are preferably substantially circular in shape.

Each cultch body is preferably curved in cross sections so that the body has a concave side and a convex side. It has been found that the best results are attained by making the body curved in cross sections transversely thereof and substantially straight in the longitudinal direction. In other words, the cultch is preferably in the form of a disk which is bent transversely thereof so that it has a shallow groove extending longitudinally of the body and curved in the transverse direction from edge to edge thereof.

Althought the cultch bodies of this invention may be formed of any suitable material, it is preferable to form them of a mixture of portland cement or aluminous hydraulic cement, lime, zinc stearate or the like, gypsum, and asbestos fibers. These constituents are mixed in a dry form and then pressed into the desired shape under relatively high pressure, for example, something in the order of 8 to 12 tons. The pressed cultch is then sprayed with a catalyzed aqueous solution, such as aqueous calcium fluoride solution in an 8% concentration, until the cultch is substantially saturated with the solution, but not sufficiently to leave free solution on the surfaces thereof. The saturated cultches are then allowed to harden or are heated until they harden. Although the cultches may be of any size, they are preferably of a diameter of about 2½ to 3 inches, and about ⅛ inch thick. A cultch made in this manner is light in weight, does not collect slime, is very attractive to oyster larvae, and, if portland cement is used, is self-destructive after exposure to sea water for about one year. The formed oysters are automatically separated from the cultch bodies by this self-destructiveness, and the one year span is about right for the normal growth of the oysters to the point where they can be separated from the cultches.

BRIEF DESCRIPTION OF THE DRAWINGS

FIG. 1 is a top plan view of a prefererd form of cultch in accordance with this invention,
FIG. 2 is a bottom plan view of this cultch,
FIG. 3 is a section taken on the line 3—3 of FIG. 1,
FIG. 4 is a section taken on the line 4—4 of FIG. 1,
FIG. 5 is a perspective view of the cultch,
FIG. 6 is an enlarged side view showing several cultches in operative position on a wire or string, and
FIG. 7 is a view similar to FIG. 6, but with one of the cultches turned 90° out of its proper position.

DESCRIPTION OF A PREFERRED EMBODIMENT

Referring to the drawings, 10 is a cultch made in accordance with this invention, and comprises a body 11 which may be of any desired shape, and in this example, it is substantially circular, as shown in FIGS. 1 and 2. This body 11 is very thin, as indicated at 13 in FIG. 3, and has opposite spaced sides 16 and 17. The body is preferably formed with one surface concave and the other convex. It is also preferable to make the upper surface 16 concave in the transverse direction relative to the body so that side 17 is convex in the transverse direction, said transverse direction being indicated by line 20 in FIG. 1. The cultch body is preferably substantially straight in the longitudinal direction, said direction being indicated by line 22 in FIG. 1. In other words, cultch body 11 is shaped somewhat like a disk that has been bent around a rod of relatively large diameter.

Cultch body 11 is formed with bearing surface means on one side thereof. In this example, the bearing surface means comprises two substantially flat bearing surfaces 25 and 26 located near edge 27 of the body at opposite ends of the concave upper surface 16 thereof. The body is also formed with spacer means projecting from the opposite side of the body, and in this example, the spacer means comprises a plurality of feet or knobs 30 and 31 projecting from side 17 of the body and aligned with bearing surfaces 25 and 26, respectively. These feet or knobs are near the ends of the convex side 17 of the body. From FIG. 1, it will be seen that bearing surfaces 25 and 26 extend longitudinally of the body, and this figure, along with FIG. 3, shows that feet or knobs 30 and 31 are positioned to rest on the bearing surfaces 25 and 26 of the next cultch body when the bodies are strung on a string, such as string or wire 34, see FIGS. 6 and 7. It is preferable to provide a hole 36 in the cultch body centrally thereof through which the string or wire extends when the cultches are strung thereon.

Although cultches 10 can be used in different ways, it is preferably to thread them on a wire 34 having a stop 39 thereon upon which the lowermost cultch rests. The wire extends through holes 36 of the cultch bodies, and the knobs 30 and 31 of each body rest upon the bearing surfaces 25 and 26 of the body therebeneath. These knobs keep the cultch bodies in proper position relative to each other so that there are always passages 40 therebetween for the free flow of water. This flow of water directs oyster spat between the cultch bodies, and it keeps all surfaces of the bodies washed so that no silting takes place. Referring to FIG. 6, it will be seen that almost the entire surfaces of the cultch bodies are available for spat. Knobs 30 and 31 normally keep the cultches properly spaced on wire 34, but if one gets turned at right angles to the other, as shown in FIG. 7, it will be seen that there still is considerable space between the cultch bodies for the free flow of water therebetween. In addition, practically the entire surfaces of the bodies are available for spat since the bottom surface of cultch body 11a makes only a line contact with the bearing surfaces of cultch body 11b, as indicated at 42 and 43. Similraly, the lower side of cultch body 11c makes only a line contact 45 with the bearing surfaces of body 11a.

When in use, strings or columns of these cultches are suspended from rafts in the water constituting the oyster bed.

We claim:

1. An artificial oyster cultch comprising a thin body having opposite face sides, said body being curved in cross section so that said body has a concave side and a convex side, bearing surface means on one side of the body, and spacer means projecting from the opposite side of the body and adopted to bear against the bearing surface means of the body of another cultch when the cultches are operatively nested together with the convex side of the body of one cultch extending into the concave side of the other cultch, said bearing surface means and said spacer means being positioned to keep most of the cultch bodies separated from each other.

2. An oyster cultch as claimed in claim 1 in which said cultch body is curved in cross section transversely of the body and is substantially straight in the longitudinal direction.

3. An oyster cultch as claimed in claim 1 in which said bearing surface means of each cultch body comprises at least two substantially flat bearing surfaces spaced from each other and located near the edge of the body.

4. An oyster cultch as claimed in claim 3 in which the spacer means of each cultch body comprises a plurality of feet aligned with the bearing surfaces of said body.

5. An oyster cultch as claimed in claim 4 in which the bearing surfaces are on the concave side of the body and said feet on the convex side of said body.

6. An oyster cultch as claimed in claim 2 in which said bearing surface means of each cultch body comprises substantially flat bearing surfaces near the ends of the transverse curve of said body.

7. An oyster cultch as claimed in claim 6 in which the spacer means of each cultch body comprises a plurality of feet aligned with the bearing surfaces of said body.

8. An oyster cultch as claimed in claim 7 in which the bearing surfaces are on the concave side of the body and said feet on the convex side of said body.

9. An oyster cultch as claimed in claim 1 in which said cultch body has a hole therethrough substantially centrally thereof, whereby the nested cultch bodies can be threaded on string supporting means.

References Cited

UNITED STATES PATENTS

| 3,294,061 | 12/1966 | Hanks | 119—4 |
| 3,294,062 | 12/1966 | Hanks | 119—4 |
| 3,316,881 | 5/1967 | Fischer | 119—4 |

FOREIGN PATENTS

| 1,278,113 | 10/1961 | France | 119—4 |

OTHER REFERENCES

A New Chapter in Shellfish Culture by William Firth Wells, Conservation Commission, State of New York, reprinted from 15th Annular Report 1925, J. B. Lyon Company, Albany, N.Y., 1926, pp. 13, 14, and 15.

ALDRICH F. MEDBERY, Primary Examiner